G. H. DAY.
EYE PROTECTOR.
APPLICATION FILED SEPT. 20, 1915.
1,216,958.
Patented Feb. 20, 1917.
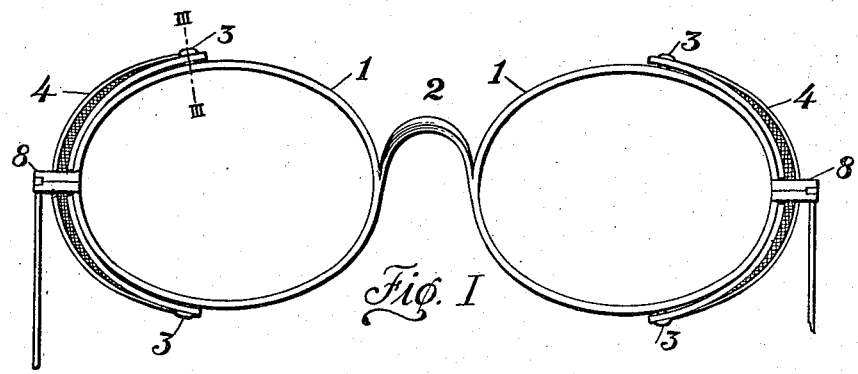
Fig. I
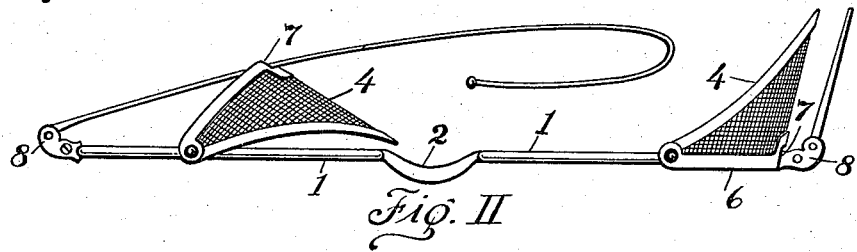
Fig. II
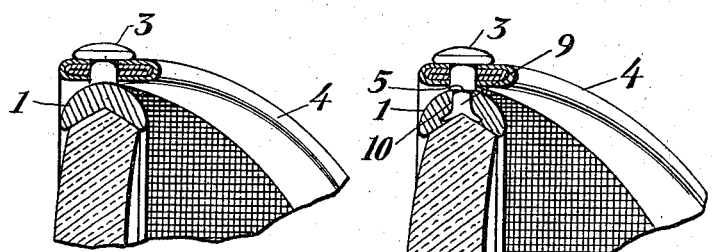
Fig. III    Fig. IV
Fig. V
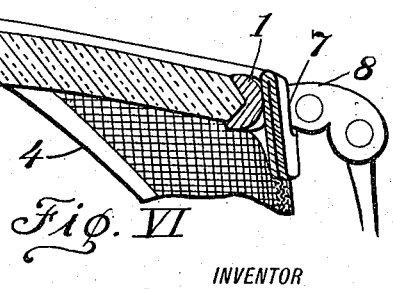
Fig. VI
WITNESSES:
Joseph J. Demey
Edith W. Halvorsen
INVENTOR
George H. Day
BY
H. H. Styll & H. K. Parsons
ATTORNEYS

UNITED STATES PATENT OFFICE.

GEORGE H. DAY, OF SOUTHBRIDGE, MASSACHUSETTS, ASSIGNOR TO AMERICAN OPTICAL COMPANY, OF SOUTHBRIDGE, MASSACHUSETTS, A VOLUNTARY ASSOCIATION OF MASSACHUSETTS.

EYE-PROTECTOR.

1,216,958.  Specification of Letters Patent.  Patented Feb. 20, 1917.

Application filed September 20, 1915. Serial No. 51,637.

*To all whom it may concern:*

Be it known that I, GEORGE H. DAY, a citizen of the United States, residing at Southbridge, in the county of Worcester and State of Massachusetts, have invented certain new and useful Improvemnts in Eye-Protectors, of which the following is a specification.

This invention relates to eye protectors and the primary object of the invention is to provide novel means for connecting the shields to the frame, and it is another object of the invention to lock the shield against the frame when in use upon the face of the wearer.

The advantage of my improved locking shield and method of connecting the shield to the frame will be readily apparent by reference to the following description taken in connection with the accompanying drawings, and it will be understood that I may make any modifications in the specific structure shown and described within the scope of the appended claims without departing from or exceeding the spirit of my invention.

Figure I is a front view of my improved eye protector.

Fig. II is a top plan view showing the shield and temple on one side in folded position.

Fig. III is an enlarged sectional view on the line III—III of Fig. I.

Fig. IV is a similar view illustrating a modified form of construction.

Fig. V is a sectional view illustrating the position of the shield before the same is locked in tight engagement with the frame.

Fig. VI illustrates a partial longitudinal sectional view taken above the temple connections, showing the shield in locked engagement with the frame.

In the drawings, in which similar characters of reference are employed to denote corresponding parts throughout the several views, the numeral 1 designates the lens frame connected by the bridge 2. Said frame has connected thereto the rivets or pins 3, upon which the shield 4 swings into open or closed position, as is clearly illustrated in Fig. II.

My preferred method for uniting these parts together is to join the rivets or pins 3 to the frame 1 direct by the fusion of solder or other flux material, as illustrated in Fig. III.

Another method is illustrated in Fig. IV, in which I provide a pin 3 having a shoulder 5 bearing against the outer face of the lens rim, to provide sufficient bearing space for the swinging side shield 4, and having the end 9 of said pin 3 extending through an aperture 10 in said frame and riveted inside of the frame, substantially as shown. Prior to my construction supplemental ears were provided on the frame having apertures to receive the pins or rivets to provide suitable connecting means for the shield to the frame.

My invention has the advantage of placing the pins or rivets direct upon the frame and doing away with said ears, thus making a lighter and neater appearing and less expensive construction.

In Figs. V and VI, I have illustrated the manner of locking the shield 4 in engagement with the outer side of the frame.

The curvature of the shield 4 at its inner edge 6 is eccentrically set on the pins or rivets in relation to the curvature of the outer edge of the frame 1, thus causing the edge of the shield to come in contact with the frame, substantially as illustrated in Fig. V, when it is only necessary to press the shield outward and forward to lock it against the frame.

In order to increase the resiliency of the shield when same is pressed into engagement with the outer edge of the frame, and to prevent distortion of said shield when so engaged, I provide a slotted portion 7 on the outer edge of the shield and by pressing the edge 6 of the shield the metal on each side of the slotted portion 7 is made to spring and spread outwardly past the rounded edge of the frame when forced into engagement with same, while as said shield is slid forwardly by said frame, the parts spring back inwardly into locked engagement with the lens frame, the slotted portion 7 of the shield spanning the temple connections 8, thus preventing any accidental disengagement of the shield from the frame.

From the foregoing description taken in connection with the accompanying drawings, it is thought that my improved construction will be clearly understood, and while I have herein shown and described the preferred forms of my invention, I do not wish to be limited thereto, except to such limitations as the claims may impart.

I claim:

1. An eye protector comprising a central bridging member and a pair of narrow lens receiving frame members, pins projecting outwardly from said frame members in the plane of the lenses, and shield members pivotally mounted on said pins in the plane of the lenses and fitting around the lens embracing rims when in open position.

2. In an eye protector, the combination with a bridging member, of a pair of lens receiving rims of substantially the thickness of the lenses to be received therein, lenses fitting within the rims, pivot members extending outwardly from the rims in the plane of the lenses, and shield members pivoted on the pivots and overlying and interlocking with the lens encircling rims when in open position.

3. The combination of a lens frame, a shield, and pivoting means for said shield placed upon the frame, the inner curvature of the shield being eccentrically set in relation to the curvature of the outer edge of the frame.

4. A lens frame, a shield, and pivoting means for said shield placed upon the frame, the inner curvature of the shield being eccentrically set in relation to the curvature of the outer edge of the frame upon said pivoting means, and said shield having a slot formed at a point midway on the outer edge of the shield to enable it to spread and lock in engagement with the frame.

In testimony whereof I affix my signature in the presence of two witnesses.

GEORGE H. DAY.

Witnesses:
H. K. PARSONS,
E. M. HALVORSEN.

Copies of this patent may be obtained for five cents each, by addressing the "Commissioner of Patents, Washington, D. C."